(12) United States Patent
Munzert

(10) Patent No.: US 9,994,256 B2
(45) Date of Patent: Jun. 12, 2018

(54) STIFFENING ELEMENT FOR A MOTOR VEHICLE FRAME

(71) Applicant: Dr. Ing. h.c. F. Porsche Aktiengesellschaft, Stuttgart (DE)

(72) Inventor: Andreas Munzert, Gerlingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 362 days.

(21) Appl. No.: 14/858,587

(22) Filed: Sep. 18, 2015

(65) Prior Publication Data

US 2016/0083010 A1    Mar. 24, 2016

(30) Foreign Application Priority Data

Sep. 19, 2014  (DE) .................. 10 2014 113 565

(51) Int. Cl.
| | | |
|---|---|---|
| *B62D 21/11* | (2006.01) | |
| *B62D 21/00* | (2006.01) | |
| *B62D 29/00* | (2006.01) | |
| *B62D 29/04* | (2006.01) | |

(52) U.S. Cl.
CPC .............. *B62D 21/00* (2013.01); *B62D 21/11* (2013.01); *B62D 29/008* (2013.01); *B62D 29/041* (2013.01)

(58) Field of Classification Search
CPC ...................................................... B62D 21/11
See application file for complete search history.

(56) References Cited

U.S. PATENT DOCUMENTS

| | | | | |
|---|---|---|---|---|
| 4,817,973 A * | 4/1989 | Takeda | ................... | B62D 21/09 280/124.13 |
| 5,879,026 A * | 3/1999 | Dostert | .................... | B60G 3/24 180/311 |
| 6,085,856 A * | 7/2000 | Law | ................... | B60G 21/0551 180/291 |
| 6,425,592 B1 * | 7/2002 | Lee | ......................... | B62D 3/12 280/124.109 |
| 8,740,231 B2 | 6/2014 | Shibaya | | |
| 2003/0107200 A1 * | 6/2003 | Huang | ..................... | B60G 7/02 280/93.515 |
| 2004/0021285 A1 * | 2/2004 | Frasch | ............... | B60G 21/0551 280/124.109 |

(Continued)

FOREIGN PATENT DOCUMENTS

| | | |
|---|---|---|
| CN | 201169297 Y | 12/2008 |
| CN | 201484493 U | 5/2010 |

(Continued)

OTHER PUBLICATIONS

German Search Report for German Application No. 10 2014 113 565.2 dated Jun. 9, 2015, including partial translation.

(Continued)

*Primary Examiner* — Ruth Ilan
(74) *Attorney, Agent, or Firm* — RatnerPrestia

(57) ABSTRACT

A stiffening element for a subframe of a motor vehicle, including a substantially horizontal section in order to confer rigidity to the subframe in the horizontal plane, and a substantially vertical section in order to confer rigidity to the subframe in the vertical plane, wherein the stiffening element is designed in such a manner that the stiffening element is arrangeable on the subframe above a steering mechanism.

11 Claims, 1 Drawing Sheet

(56) References Cited

U.S. PATENT DOCUMENTS

Figure 1:
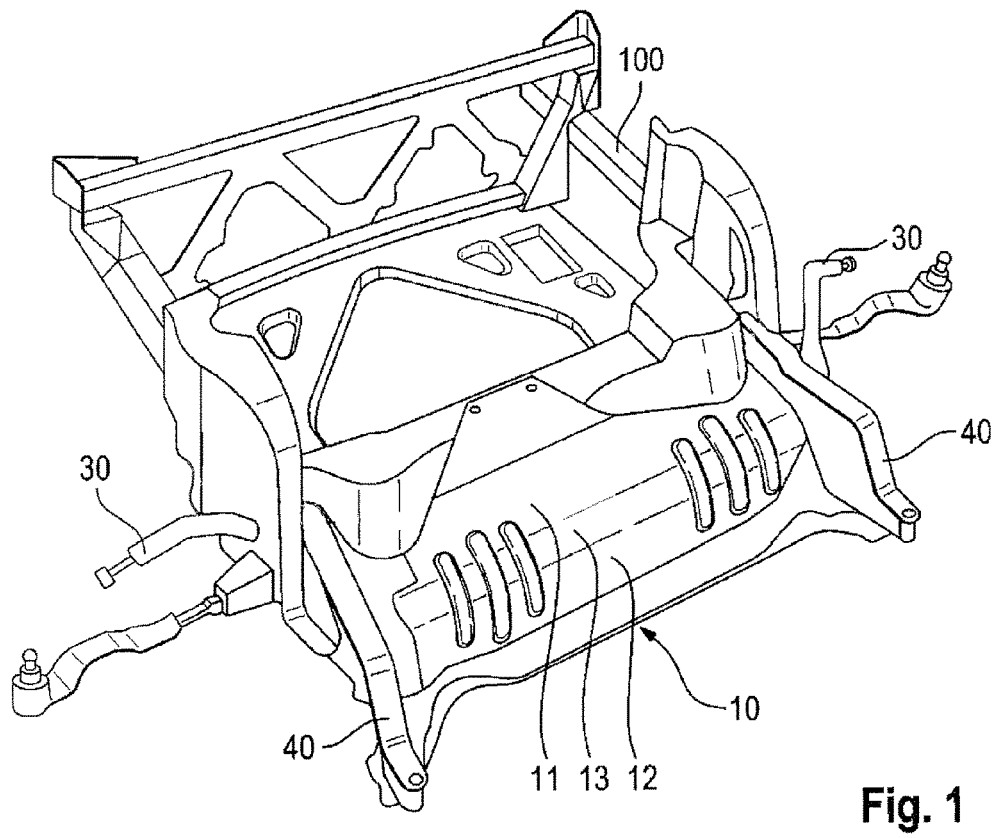

| | | | |
|---|---|---|---|
| 2005/0116434 A1* | 6/2005 | Kim | B62D 3/12 280/93.502 |
| 2007/0024044 A1* | 2/2007 | Ogawa | B60G 3/20 280/788 |
| 2008/0258417 A1 | 10/2008 | Cordier | |
| 2012/0104739 A1* | 5/2012 | Buschjohann | B22D 19/0072 280/781 |
| 2012/0235397 A1* | 9/2012 | Kroger | B62D 21/11 280/785 |
| 2013/0168939 A1* | 7/2013 | Buschjohann | B62D 3/12 280/124.109 |
| 2015/0014955 A1* | 1/2015 | Leibl | B60G 3/20 280/124.107 |
| 2015/0298741 A1* | 10/2015 | Winberg | B62D 21/155 296/187.09 |
| 2016/0194029 A1* | 7/2016 | Kramer | B60G 21/0555 280/124.109 |

FOREIGN PATENT DOCUMENTS

| | | |
|---|---|---|
| CN | 203497001 U | 3/2014 |
| DE | 10235110 | 2/2004 |
| DE | 102005017031 | 10/2006 |
| DE | 102008014501 A1 | 9/2009 |
| DE | 102013004804 | 9/2013 |
| GB | 2457591 A | 8/2009 |
| JP | 2011240787 A | 12/2011 |
| KR | 20070072423 | 7/2007 |

OTHER PUBLICATIONS

Chinese Office Action for Chinese Application No. 201510594092.5, dated Apr. 27, 2017, including English translation, 13 pages.

Korean Office Action with English translation for Application No. 10-2015-0130993, dated Aug. 10, 2016, 7 pages.

\* cited by examiner

STIFFENING ELEMENT FOR A MOTOR VEHICLE FRAME

CROSS-REFERENCE TO RELATED APPLICATION

This application claims priority to German Patent Application No. 10 2014 113 565.2, filed Sep. 19, 2014, which is incorporated by reference herein in its entirety.

FIELD OF THE INVENTION

The present invention relates to a stiffening element for a subframe of a motor vehicle and to a subframe for a motor vehicle.

BACKGROUND OF THE INVENTION

It is known to use stiffening elements for motor vehicle subframes, which are likewise referred to as shear areas. In recent years, subframes have been designed to be increasingly lighter. The stiffening elements serve here to impart the required rigidity to the subframes. Conventional subframes are designed as sheetlike areas which are arranged below the steering mechanism.

A first disadvantage of the known stiffening elements is that, in the case of lower motor vehicles, there is little space available below the steering mechanism for attaching the stiffening elements, in order to attach a conventional stiffening element. Another disadvantage is that such sheetlike stiffening elements are suitable only for supporting tensile forces and shearing forces in just one plane which coincides with the plane of the stiffening elements. By contrast, said sheetlike stiffening elements cannot support any forces which can act vertically and asymmetrically on the subframe, for example on the part of a stabilizer. A further disadvantage is that such stiffening elements may block the assembly path to the steering mechanism and may not protect the steering mechanism against engine heat.

SUMMARY OF THE INVENTION

Described herein is a stiffening element and a subframe for a motor vehicle, which can find room even in lower motor vehicles, permit better rigidity support in different directions and can provide heat protection for the steering mechanism.

Features and details which are described in conjunction with the stiffening element also apply here in conjunction with the subframe and vice versa in each case, and therefore, with regard to the disclosure, reference is always, and can always be, made reciprocally to the individual aspects of the invention.

According to aspects of the invention, a stiffening element for a subframe of a motor vehicle is provided, which stiffening element is designed with a substantially horizontal section in order to impart rigidity to the subframe in the horizontal plane, and with a substantially vertical section in order to impart rigidity to the subframe in the vertical plane. The stiffening element here is designed in such a manner that the stiffening element can be arranged on the subframe at an elevation above a steering mechanism.

One advantage of the stiffening element according to aspects of the invention consists in that the stiffening element can find room below the steering mechanism even in the case of very low steering mechanisms. A further advantage of the invention is that the stiffening element is suitable for providing better lateral rigidity support than the conventional stiffening elements, which can support the forces acting on the subframe only in one plane. In addition to the forces which can act on the subframe in the horizontal plane, forces which act laterally on the subframe can also be produced. This takes place in particular if the stabilizer bearings are located further on the outside or further on the inside than the screw points between subframe and body. The stabilizer acts here like a spring element between the body and the wheels and, by rotation about the stabilizer bearings, ensures an improvement in the road position of the wheels. Asymmetrical forces with respect to the pivot axis of the stabilizer arise here, said forces acting substantially laterally on the subframe. Conventional, flat stiffening elements fail to absorb such lateral forces. The stiffening element according to aspects of the invention advantageously comprises here not only a horizontal section for supporting horizontal forces, but also a vertical section which is configured to reliably absorb asymmetrical vertical forces, for example on the part of the stabilizer.

A further advantage of the stiffening element according to aspects of the invention also resides in the fact that the stiffening element is suitable, because of the position thereof above the steering mechanism, to serve as heat protection for the steering mechanism. For this reason, the stiffening element according to aspects of the invention can serve to be used on that side of the motor vehicle where the engine is located, for example at the front.

It may be advantageous if the stiffening element can have a curved section between the horizontal section and the vertical section. The advantage here resides in the fact that the horizontal section and the vertical section, which compensate for forces oriented perpendicularly to one another, do not merge in each other abruptly and do not have any sharp edge in between, in order to avoid a predetermined breaking point between the horizontal section and the vertical section. The curved section therefore advantageously ensures the stability between two planes of the stiffening element. In addition, it is of advantage that a flowing transition from the horizontal force plane to the vertical force plane takes place on the stiffening element via the curved section. From a geometrical aspect, the curved section is an advantageous shape in order to minimize the surface tension at the transition between a horizontal plane and a vertical plane. Forces can be optimally supported here in all directions between the horizontal and the vertical by that point of the curved section at which the respective force acts tangentially being able to be stressed the most. The stiffening element therefore ensures a good distribution of forces on the subframe of the motor vehicle. In addition, the stiffening element is particularly robust and stable since the tension effects on the stiffening element designed in such a manner can be minimized.

A further advantage is obtainable if the stiffening element can be formed monolithically and/or of one material. Further tension effects and even cracks on the stiffening element due to differently oriented forces can thereby be avoided if the stiffening element does not have any connecting points, for example any welding points or the like. The stability and period of use of the stiffening element can thereby be considerably increased. Consequently, the outlay on production and assembly of the stiffening element can also be reduced, in particular in comparison to stiffening elements made of a plurality of separate parts.

According to aspects of the invention, it can be provided that the stiffening element can be formed from a plastic, in particular from a fiber-reinforced plastic. The stiffening element can therefore be produced cost-effectively in mass production by injection molding. According to a particular advantage, the plastic can be a fiber-reinforced plastic which can be composed of a plastics matrix and reinforcing fibers. The plastics matrix embeds the reinforcing fibers here and supports the position thereof, wherein the reinforcing fibers conduct the forces through the material since said reinforcing fibers have greater rigidity than the plastics matrix. The plastics matrix can advantageously serve to reduce the weight of the reinforcing element. This makes the stiffening element particularly suitable for use in modern lightweight motor vehicles. At the same time, the reinforcing fibers can nevertheless ensure high specific rigidities and strengths of the stiffening element in order readily to support forces. Good transmission of forces can take place here along the reinforcing fibers. By a suitable selection of fiber angles, high strength of the stiffening element can be set in at least one, in particular two or more directions, in order better to dissipate the differently oriented forces.

Alternatively, it can be provided that the stiffening element can be formed from metal, in particular from steel or aluminum. It is conceivable here for the stiffening element to be able to be trimmed in a cost-effective manner from a sheet-metal material and to be produced by subsequent molding. By specific addition of alloy elements, the properties of the steel can be optimally adapted in order to achieve maximum tensile strength of the stiffening element. The stiffening element made of steel can be advantageously suitable because of the deformability and low weight thereof for use in the case of lightweight motor vehicles.

It is furthermore advantageous if the stiffening element is formed in such a manner that the stiffening element is arranged above a transverse link since a direct flow of force into the body is thereby made possible. As a result, better access not only to the steering mechanism but also to the stabilizer in the event of a repair can be ensured, and also better transmission of force to the stiffening element, in particular to the vertical region of the stiffening element, can be achieved.

According to aspects of the invention, the stiffening element can be connected releasably, in particular screwed, to the subframe. The advantage here can reside in the fact that the stiffening element can be retrofitted on existing subframes in order to improve the distribution of forces to the motor vehicle. It is likewise advantageous to mount the stiffening element in a removable manner in order to ensure better accessibility to individual components of the vehicle and, in addition, to achieve easier assembly.

According to aspects of the invention, it can alternatively be provided that the stiffening element can be connected in an integrally bonded manner, in particular adhesively bonded, to the subframe. The effect can therefore advantageously be achieved that the subframe together with the stiffening element can be designed as an assembly which can be mutually fastened to the motor vehicle in order to facilitate the assembly even further.

The subject matter of the present invention is likewise a subframe for a motor vehicle with a stiffening element, as is described above, wherein the stiffening element is arranged on the subframe above the steering mechanism. The first advantage of the subframe according to aspects of the invention is that the latter is suitable for low motor vehicles which frequently have only little room, if any at all, for a stiffening element below the steering mechanism. The second advantage of the invention is that the subframe permits better stability of the motor vehicle than the conventional subframes, which can support the acting forces only in one plane. By means of the use of the stiffening element on the subframe, the subframe can not only support the forces which act on the subframe in the horizontal plane, but also the forces which can act laterally on the subframe. Finally, a further advantage of the subframe resides in the fact that the subframe can serve as heat protection for the steering mechanism. For this reason, the subframe is suitable in particular to be used on the engine side of the motor vehicle, for example on the front axle.

It is likewise advantageous that profile parts can be provided laterally on the subframe in order to support the subframe and the stiffening element on the body of the motor vehicle. The profile parts can advantageously be adapted to the respective model of vehicle in order to make the subframe universally usable. In addition, it is conceivable for the profile parts to be able to serve for the exclusive or additional fastening of the stiffening element to the subframe.

BRIEF DESCRIPTION OF THE DRAWING FIGURES

Figure 2:
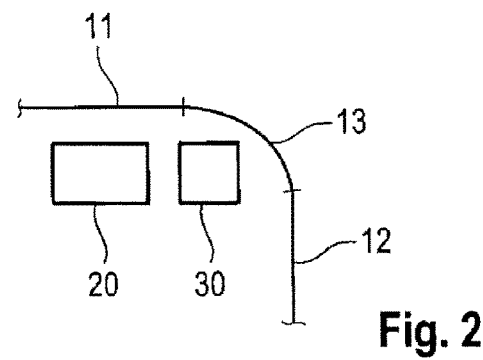

Further advantages, features and details of the invention emerge from the description below in which an exemplary embodiment of the invention is described in detail with reference to the drawings. The features mentioned in the claims and in the description may be essential to the invention in each case individually by themselves or in any combination. In the drawing, schematically:

FIG. 1 shows an embodiment of a subframe according to aspects of the invention with a stiffening element, and FIG. 2 shows a sectional illustration of the stiffening element according to aspects of the invention.

DETAILED DESCRIPTION OF THE INVENTION

FIG. 1 illustrates how a stiffening element 10 can be arranged on a subframe 100, and FIG. 2 illustrates how the stiffening element 10 according to aspects of the invention is designed in cross section.

According to FIGS. 1 and 2, the stiffening element 10 has a substantially horizontal section 11 in order to impart rigidity to the subframe 100 in the horizontal plane, and a substantially vertical section 12 in order to impart rigidity to the subframe 100 in the vertical plane. The stiffening element 10 here is arranged on the subframe 100 above a steering mechanism 20. The steering mechanism 20 is shown schematically, and it may comprise track rods, steering gears, and/or tie rods. In addition, the stiffening element 10 has a curved section 13 between the horizontal section 11 and the vertical section 12 in order to form a flowing transition between the horizontal section 11 and the vertical section 12 and to provide stability between two planes 11, 12 of the stiffening element 10. The curved section 13 is arched outward here and in the cross section, which is illustrated in FIG. 2, is in the shape of a quarter circle segment, wherein the respective circle tangent lies in each case in the horizontal or vertical at the intersecting point with the horizontal section 11 or with the vertical section 12. This circle shape in the transition between two vertical planes of the sections 11 and 12 advantageously corresponds to the optimum shape in order to minimize the sheet-metal deformation at the transition between the horizontal plane 11 and the vertical plane 12. Consequently, the forces acting on the subframe 100 can be optimally supported in all directions between the horizontal plane of the section 11 and the vertical plane of the section 12. The configuration of the stiffening element 10 according to aspects of the invention with the curved section 13 is particularly robust and stable since no bend, and therefore no predetermined breaking point, arises between the horizontal section 11 and the vertical section 12. As can be seen from FIGS. 1 and 2, the stiffening element 10 is formed monolithically as one component in order to improve the stability and period of use of the stiffening element 10 even further. It is conceivable here for the stiffening element 10 to be able to be formed from one material, for example from a plastic or from a metal. The stiffening element 10 can therefore be produced in a cost-effective manner and can be mounted more simply as a structural element than as an element made from a plurality of separate parts.

As FIG. 1 shows, the stiffening element 10 is arranged on the subframe 100 above a stabilizer 30 in order to support lateral forces originating from the stabilizer 30. When required, the stabilizer 30 with the stabilizer bearings (not illustrated) lying below the stiffening element 10 and intended for the pivotable mounting of the stabilizer 30 can be supported here against the upper section 11 or against the curved section 13 of the stiffening element 10. The stabilizer screw points (likewise not illustrated specifically) with respect to the wheels are not located here on the same line as the stabilizer bearings, but rather behind the latter. When the stabilizer 30 rotates in order to compensate for the road position of the wheels, asymmetrical forces with respect to the pivot axis of the stabilizer 30 arise, said forces being substantially vertical and acting laterally on the subframe 100. According to aspects of the invention, said lateral forces can be dissipated via the vertical section 12 of the stiffening element 10. As can furthermore be seen from FIG. 1, the stiffening element 10 is connected to the subframe 100 by means of screws. Alternatively, however, it can be provided that the stiffening element 10 can be connected in an integrally bonded manner, for example adhesively bonded, to the subframe 100.

According to aspects of the invention, the stiffening element 10 can be provided as an independent structural element and/or together with the subframe 100 as an assembly for use in a motor vehicle. According to aspects of the invention, profile parts 40 are provided laterally on the subframe 100 in order to fasten the subframe 100 and the stiffening element 10 to the body of the motor vehicle. The profile parts 40 advantageously serve to use the subframe 100 according to aspects of the invention and the stiffening element 10 universally in different models of vehicle. In addition, the profile parts can be configured in order to fasten the stiffening element 10 laterally to the subframe 100.

The above explanation of the embodiment describes the present invention exclusively within the scope of examples.

Of course, individual features of the embodiment can be developed further, if technically expedient, without departing from the scope of the present invention.

What is claimed is:

1. A subframe and a stiffening element for the subframe of a motor vehicle, the subframe including two longitudinally extending portions that are spaced apart in a lateral direction, and the stiffening element being monolithic and comprising a substantially horizontal section that extends laterally between the two longitudinally extending portions of the subframe and confers rigidity to the subframe in a horizontal plane, a substantially vertical section that extends vertically and confers rigidity to the subframe in a vertical plane, and a curved section extending vertically between the horizontal section and the vertical section and extending horizontally from one longitudinally extending portion to the other longitudinally extending portion, wherein the stiffening element is arrangeable on the subframe above a steering mechanism.

2. The subframe and stiffening element as claimed in claim 1, wherein the stiffening element is formed from a plastic.

3. The subframe and stiffening element as claimed in claim 1, wherein the stiffening element is formed from a fiber-reinforced plastic.

4. The subframe and stiffening element as claimed in claim 1, wherein the stiffening element is formed from metal.

5. The subframe and stiffening element as claimed in claim 1, wherein the stiffening element is formed from steel or aluminum.

6. The subframe and stiffening element as claimed in claim 1, wherein the stiffening element is arrangeable on the subframe above a stabilizer in order to support lateral stabilizer forces.

7. The subframe and stiffening element as claimed in claim 1, wherein the stiffening element is releasably connected to the subframe.

8. The subframe and stiffening element as claimed in claim 1, wherein the stiffening element is screwed to the subframe.

9. The subframe and stiffening element as claimed in claim 1, wherein the stiffening element is connected in an integrally bonded manner to the subframe.

10. The subframe and stiffening element as claimed in claim 1, wherein the stiffening element is adhesively bonded or welded to the subframe.

11. The subframe as claimed in claim 1, wherein profile parts are provided laterally on the subframe in order to support the subframe and the stiffening element on a body of the motor vehicle.

* * * * *